United States Patent [19]

Karlstrom

[11] Patent Number: 4,543,569
[45] Date of Patent: Sep. 24, 1985

[54] VEHICULAR ALARM TRIGGERING SYSTEM

[75] Inventor: J. Krister Karlstrom, Stockholm, Sweden

[73] Assignee: AudioPro Marketing, Sodertalje, Sweden

[21] Appl. No.: 494,062

[22] Filed: May 12, 1983

[51] Int. Cl.⁴ ................... G08B 1/08; B60R 25/00
[52] U.S. Cl. ........................ 340/539; 340/63; 340/52 B; 340/574; 340/52 R; 307/10 AT; 200/61.29; 200/61.89; 200/86.5
[58] Field of Search ............ 340/539, 573, 574, 547, 340/575, 63, 69, 665–668, 52 R, 52 B, 52 F, 514; 307/10 AT, 10 R; 200/61.29, 61.89, 61.91, 61.93, 86.5

[56] References Cited

U.S. PATENT DOCUMENTS

| | | | |
|---|---|---|---|
| 1,993,497 | 3/1935 | Wells | 340/52 R |
| 2,803,810 | 8/1957 | Evans et al. | 340/574 |
| 2,840,795 | 6/1958 | Yun Gee | 340/63 |
| 2,877,361 | 3/1959 | Chase | 340/547 |
| 3,534,350 | 10/1970 | Sellinger et al. | 340/514 |
| 3,912,892 | 10/1975 | Morehouse | 340/69 |
| 3,913,066 | 10/1975 | Kehry et al. | 340/63 |
| 3,986,166 | 10/1976 | Kohn | 340/63 |
| 4,259,664 | 3/1981 | Boisclair | 340/574 |

Primary Examiner—Donnie L. Crosland
Attorney, Agent, or Firm—Staas & Halsey

[57] ABSTRACT

A vehicle alarm triggering system having a trigger switch mounted such that a reverse force applied to the vehicle brake pedal causes either a continuous silent alarm, e.g., a radio signal to be transmitted, or an audible alarm to be activated. The triggering system includes a test mode enabling the alarm to be briefly activated, and a trigger switch such as a dry-reed encapsulated switch activated by a permanent magnet.

13 Claims, 15 Drawing Figures

NORMALLY OPEN

NORMALLY CLOSED

VEHICULAR ALARM TRIGGERING SYSTEM

BACKGROUND OF THE INVENTION

The present invention is directed to improving the security and safety of those driving vehicles, especially those associated with commercial transportation, such as taxi cabs. In particular, the present invention relates to a system enabling discrete triggering of an alarm whenever a driver is in danger of, for example, a robbery. In such a situation, the driver's movement is severely restricted since the threat of physical harm is always an element in a robbery. Thus, an alarm must be capable of being triggered with only minimal unnoticeable movement by the driver. However, the alarm should not be falsely triggered by normal driver and vehicle movement during operation of the vehicle. In addition to minimizing false alarms, the triggering system should enable the alarm to be tested such that the alarm is activated without indicating an alarm condition.

SUMMARY OF THE INVENTION

Accordingly, it is an object of the present invention to provide a vehicular alarm triggering system capable of being triggered by minimal and unnoticeable movement by the driver.

Another object of the present invention is to provide a vehicular alarm triggering system which allows normal driver and vehicle operation without risk of triggering the alarm.

A further object of the present invention is to provide a vehicular alarm triggering system capable of reliable operation in a hostile environment. A further object of the present invention is to provide a vehicular alarm triggering system operable independent of the operating condition of the vehicle engine. Still a further object of the present invention is to provide a vehicular alarm triggering system capable of being triggered by minimal movement of the driver's foot.

Still another object of the present invention is to provide a vehicular alarm triggering system testable before operation of the vehicle, to ensure proper functioning of the triggering system and the alarm.

To achieve the foregoing objects, the alarm triggering system of the present invention comprises a trigger switch operated by reverse force being applied to the back side of the vehicle brake pedal, a locking receiving circuit operably connected to receive a signal from the trigger switch and to initiate the action of the alarm.

In a preferred embodiment of the alarm triggering system, a trigger switch such as a dry-reed switch operated by a magnet is mounted such that reverse force on the back side of a vehicle brake pedal activates the switch, and a receiving circuit is operatively connected to this trigger switch. When the trigger switch is activated, the receiving circuit senses this state and sets the alarm into its on state. The alarm can include a radio transmission to a remote central dispatch unit, or a local alarm such as flashing the headlights of the vehicle or sounding the vehicle horn for a set period of time.

BRIEF DESCRIPTION OF THE DRAWINGS

The accompanying drawings, which are incorporated in and constitute part of the specification, illustrate an embodiment of the present invention, and together with the description, serve to explain the principles of the invention.

DESCRIPTION OF THE PREFERRED EMBODIMENTS

Figure 1:
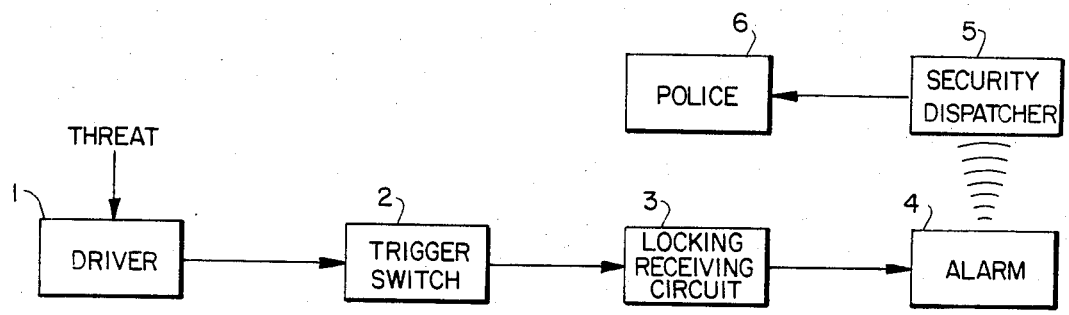
FIG. 1 is a block diagram of a first alarm system employing a trigger switch according to the present invention, wherein activating the trigger switch results in the operation of a silent alarm to alert a remote security dispatcher.

In the following description, similar elements are labeled with like reference numerals in each of the figures. Referring to FIG. 1, the overall vehicular alarm system includes a foot trigger switch 2 operated by the driver 1 applying a reverse force to the vehicle brake pedal. The trigger switch 2 provides a signal which activates a locking receiving circuit 3. The locking receiving circuit 3 both detects the operation of the trigger switch and in response thereto, provides a signal to activate an alarm 4. As illustrated, the alarm 4 includes means, such as a radio transmitter, designed to transmit an alarm signal of a predetermined frequency to the remote security dispatcher 5. On receiving the alarm signal, the security dispatcher 5 can alert the police 6 to investigate the threat to the driver.

Within this system, the element most critical to the driver is the trigger switch 2. That is, in events such as a robbery, the driver's movements are severely restricted. Thus, the driver in the face of a threat must be able to activate the trigger switch without drawing suspicion from the source of the threat. Since the driver's feet, while operating the vehicle, are normally in the region of the pedals (e.g., brake or gas pedal) practically any movement by the driver can be translated into an unnoticeable foot movement designed to apply a reverse force to the rear of the brake pedal and to activate the trigger switch. For example, if during a robbery, the driver is required to sit still in the driver's seat, then only slight inconspicuous movement of his foot against the back of the pedal will cause the trigger switch to be activated. Additionally, if the driver is required to exit the vehicle, it is a simple matter to merely drag a foot past the pedal to activate the trigger switch and enable the alarm.

Figure 3:
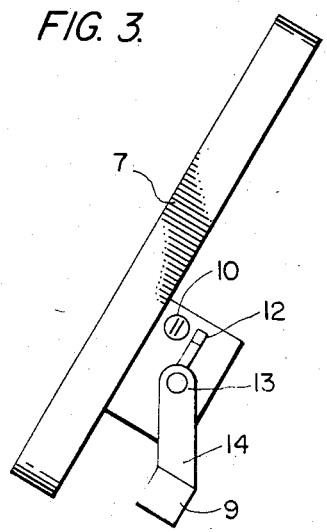
FIG. 3 is a side view illustrating details of the FIG. 2 trigger switch.

The trigger switch 2 shown in FIG. 1 includes a switch which is capable of being operated in a hostile environment. For example, the trigger switch 2 can comprise a spring-loaded switch including two conductive strips spaced apart by the operation of a spring, and pressed together by the foot of the driver applying a reverse force to the rear of the pedal which activates the receiving circuit 3. Furthermore, as shown in FIG. 3, the trigger switch 2 can include a dry-reed capsule 10 operated by a permanent magnet 12. These examples are cited as illustrations and are not intended to limit the embodiments of the present invention so as to exclude others not recited in the examples.

Figure 2:
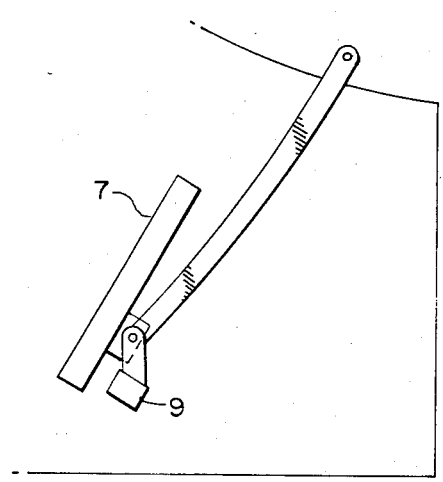
FIG. 2 is a side view of a first embodiment of the trigger switch of the present invention.
Figure 5:
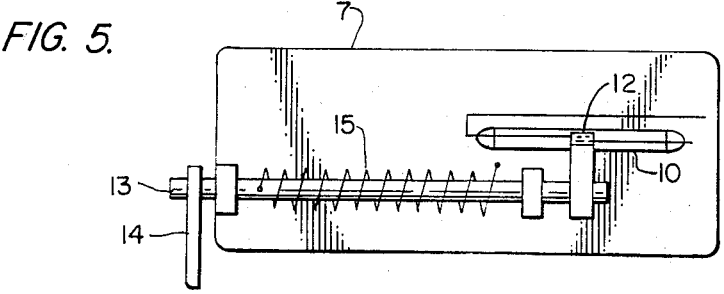
FIG. 5 is a rear view of the FIG. 3 trigger switch.

FIG. 2 is a side view of a first embodiment of the trigger switch of the present invention. FIG. 3 is a side view illustrating the details of the FIG. 2 trigger switch. In this figure, a bar 9 is pivotably mounted on axle 13, such that a force applied to the bar 9 in the direction of the pedal 7 causes the magnet 12 to be drawn away from the dry-reed capsule 10; thus changing the state of the contacts within the dry-reed capsule 10. When no reverse force is applied to the bar 9, the magnet 12 is held in close proximity to the dry-reed 10 such that the dry-reed contacts are activated due to the influence of the magnet 12. To maintain the magnet 12 at close proximity to the dry-reed capsule 10, a spring, like spring 15 shown in FIG. 5, can be mounted on the axle 13 such that a force is applied to the bar 9 through arm 14 tending to move the bar 9 away from the pedal 7.

Figure 4:
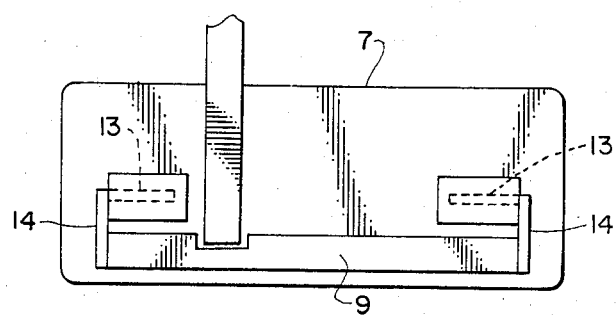
FIG. 4 is a top view of the FIG. 3 trigger switch.

As seen in FIG. 4, the bar 9 extends for substantially the full width of the pedal 7. Employing a bar 9 having a width such as that shown in FIG. 4, maximizes the opportunity for the driver to apply reverse force to the bar 9 when desiring to activate the alarm. Additionally, since the bar 9 extends across the brake pedal 7, positioning the bar 9 as shown in FIG. 4 requires only a minimum amount of movement by the driver to activate the alarm.

Figure 6:
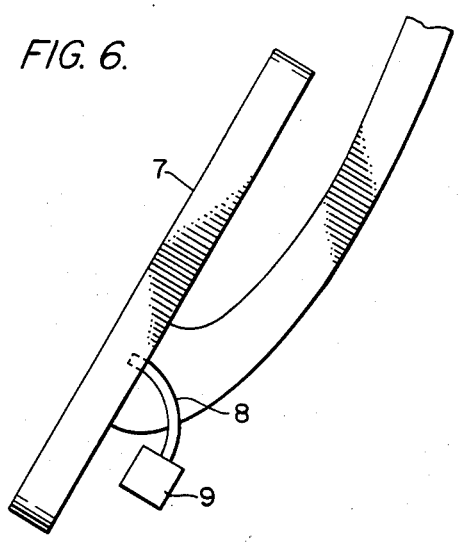
FIG. 6 is a side view of a second embodiment of the trigger switch of the present invention.
Figure 7:
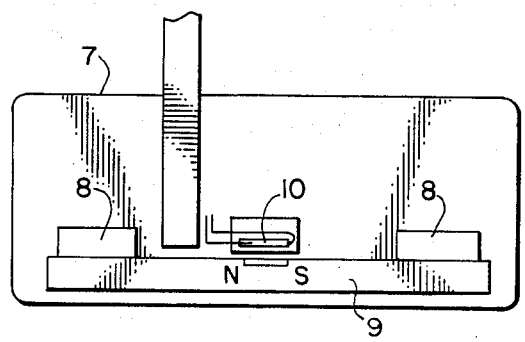
FIG. 7 is a top view of the FIG. 6 trigger switch.
Figure 8A:
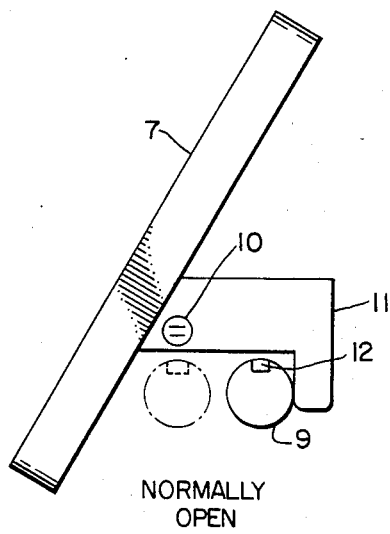
FIGS. 8A and 8B are side views illustrating the operation of the FIG. 6 trigger switch.
Figure 8B:
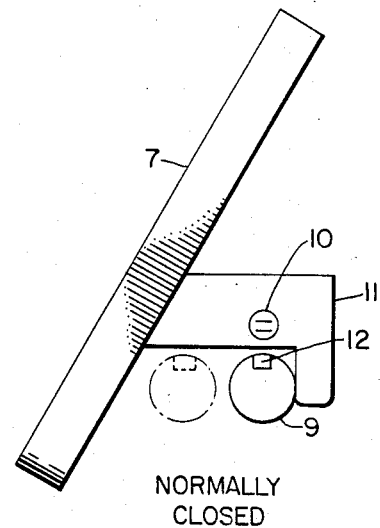

FIG. 6 illustrates a second embodiment of the trigger switch of the present invention. In this embodiment, the axle 13 and spring 15 of the first embodiment are replaced by a flexible member 8. A simplified mechanism such as illustrated in FIG. 6 could, instead of being mounted on the brake pedal 7, be mounted on a platform which then could be mounted on any existing brake pedal. Thus, the system employing the simplified mechanism of FIG. 6 can be retrofitted onto almost any existing vehicle pedal. As shown in FIG. 7, a flexible member 8 is provided at each end of the bar 9. The flexible member 8 is shaped so that it tends to move the bar 9 away from the pedal 7. Consequently, as shown in FIGS. 8A and 8B, a stop 11 is mounted such that it holds the bar 9 in position against the stop 11 due to the force exerted by the flexible member 8. Since at all times, except when activating the alarm, the bar 9 is positioned against the stop 11, the dry-reed capsule 10 can be positioned such that a non-alarm condition is indicated by either normally open or normally closed contacts as illustrated in FIGS. 8A and 8B, respectively. For example, in FIG. 8A, a reverse force must be applied to the bar 9 to move the magnet 12 sufficiently close to the dry-reed capsule 10 such that the dry-reed capsule contacts are activated and the alarm triggered. An alternative arrangement such as the trigger switch configuration shown in FIG. 8B provides that the contacts of the dry-reed capsule 10 are normally under the influence of the magnet 12. Because the contacts are under the influence of the magnet 12, this arrangement may minimize the possibility of inadvertent triggering of the alarm due to normal vehicle vibration or pedal operation.

Figure 9:
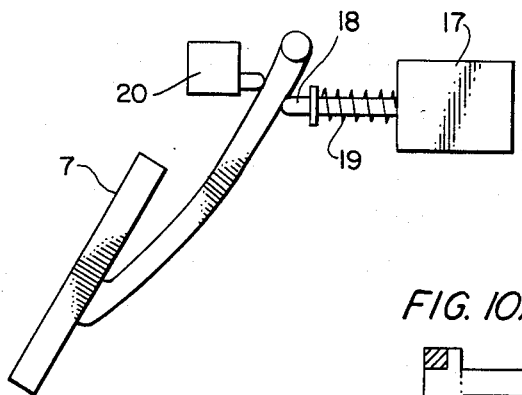
FIG. 9 is a side view of a third embodiment of the trigger switch of the present invention.
Figure 10:
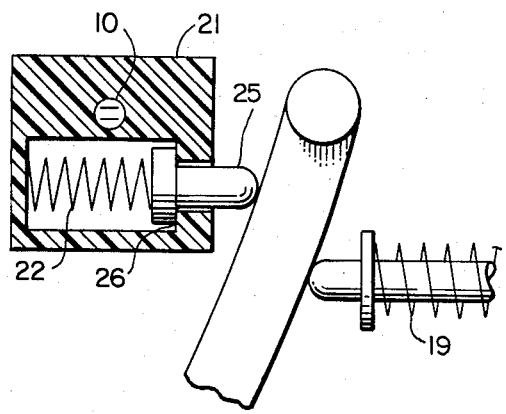
FIGS. 10 and 10B are sectional diagrams illustrating the essential elements of the FIG. 9 trigger switch.
Figure 10A:
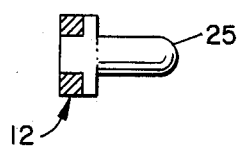

A third embodiment of the trigger switch of the present invention is illustrated in FIGS. 9 and 10. As shown in FIG. 9, the trigger switch 20 is mounted in opposition to the force provided by the master brake cylinder 17 through the spring 19 and plunger 18. This arrangement provides, as shown in FIG. 10, that the spring 22, mounted in housing 21, exerts a force larger than the force from spring 19, so the plunger 25 is prestressed against its stop 26. Thus, the plunger 25 acts as a stop for the pedal 7 which holds the pedal in its non-operating position. FIG. 10A shows a sectional view of one arrangement for the magnet 12 in conjunction with the plunger 25. When the driver presses the brake pedal 7 the master cylinder spring 19 and plunger 18 operate in the normal manner. However, when the pedal 7 is released the plunger 18 will return the pedal 7 to its non-operating position determined by the stop position of plunger 25. In this arrangement, as with the first and second embodiments of the trigger switch of the present invention, only a reverse force applied to the pedal 7 will trigger the alarm.

As shown in FIG. 10, the dry-reed capsule 10 is in the normally open position. However, as with the second embodiment, the dry-reed can be positioned such that it is either in the normally open or normally closed positions with respect to the magnet 12. To trigger the alarm using the trigger switch of FIG. 10, the driver merely applies a reverse force to the pedal 7 causing the pedal to move away from the brake plunger 18, and moving plunger 25 against spring 22, so that the magnet 12 is moved with respect to the dry-reed capsule 10. Thus, the dry reed contacts are either open or closed depending upon the mounting position of the dry-reed capsule 10 with respect to the magnet 12. In this embodiment, any wiring to the trigger switch 20 could be provided along with the other wiring under the vehicle dash board, thus eliminating the necessity of running wires the length of the pedal 7 to reach the dry-reed capsule 10 mounted as shown in, for example, either of the first or second embodiments.

The accompanying Figures illustrate that in any of the trigger switch embodiments, the trigger switch can be either a normally open or a normally closed switch. Further, since the receiving circuit senses the change in the state of the trigger switch the selection of the normally open or closed arrangement depends upon the requirement of a particular installation. For example, to minimize the drain on the battery when the engine is not running, the switch can be a normally open switch that is activated by closing the switch contacts thus causing a small current to flow through the switch resulting in the receiving circuit being activated. It will be obvious to those skilled in the art that switches such as the dry-reed capsule operated by the permanent magnet switch are well suited to applications requiring reliable operation in a dirty environment such as the dirt, mud, water or snow that is likely to be found near a vehicle pedal.

Mounting the trigger switch of the present invention in the preferred location such that it is activated by a reverse force applied to the brake pedal allows the trigger switch to be used in a wide variety of vehicles. This is especially true since some vehicles are not equipped with clutch pedals, and further, during normal vehicle operation, the brake pedal is not used as frequently as either the clutch or gas pedal. Thus, mounting the trigger switch on the brake pedal subjects the switch to less frequent movements than if the switch was mounted on, for example, a clutch pedal. Moreover, since it is a goal of the present invention to enable the driver to discretely activate the trigger switch, and it is normal for the brake pedal to be positioned a distance from the floor of the vehicle, it is an easy matter to position a foot behind the brake pedal to activate the trigger switch.

Figure 11:
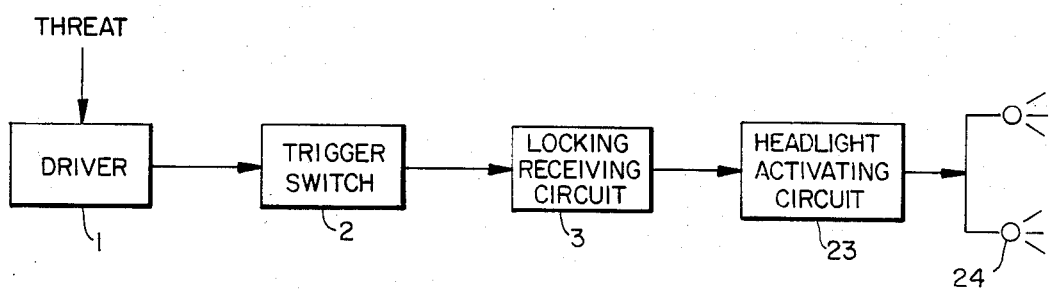
FIG. 11 is a block diagram of a second alarm system employing a trigger switch according to the present invention wherein activating the trigger switch results in the operation of a local alarm, such as flashing headlights or sounding an audible alarm for a predetermined time.

FIG. 11 illustrates a second alarm system employing a trigger switch according to the present invention wherein the alarm comprises the vehicle lights 24 which are activated in an abnormal manner for a predetermined time. Specifically, when activated by the locking receiver circuit 3, the headlight activating circuit 23 is designed to flash the headlights for a period of time, thus signifying that the driver of the vehicle is in danger. This embodiment envokes the cooperation of individuals in the locale of the vehicle to assist and protect the well-being of the driver. As a result, this system has a potential for immediate response to the driver's distress call. The headlight activating circuit 23 includes, for example, an astable multivibrator designed to flash the vehicle lights 24.

An important feature of any alarm system embodying a trigger switch is the capability of being tested without locking the alarm in its active state. Equally important is the feature that once the alarm is activated, it cannot be deactivated by any feature of the test capability. As described above and as shown in FIG. 12, the trigger switch 2 applies a trigger signal to the locking receiver circuit 3. In normal operation, the locking receiving circuit would then activate and hold the alarm 4 in its active state until the remote or manual key disable signal 29 was received. In the case of a taxi security system the remote disable signal would be provided by, for example, the security dispatcher 5 shown in FIG. 1. However, in the test mode a test signal is applied to the locking receiving circuit 3 before the trigger signal. Accordingly, the alarm 7 is activated but only for the time that the trigger switch is active.

Figure 12:
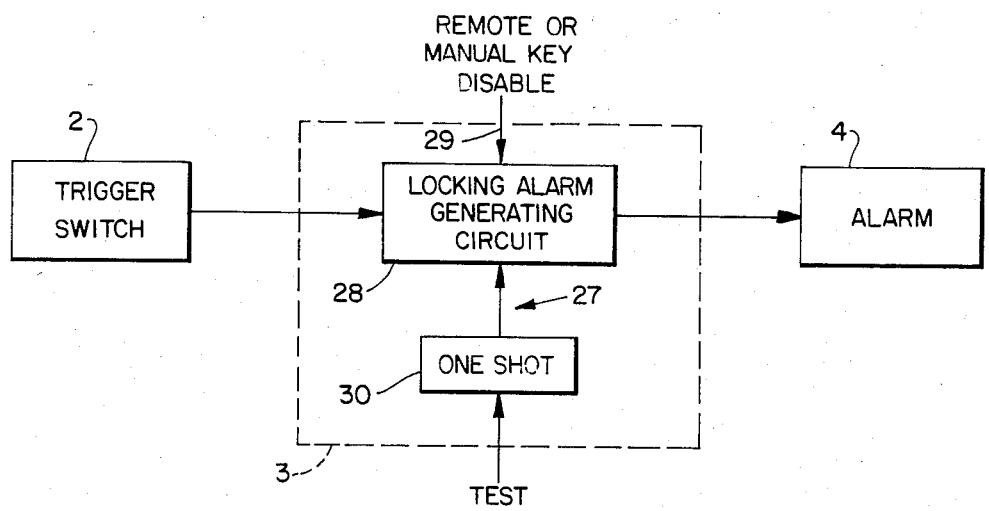
FIG. 12 is a block diagram illustrating the test features of an alarm system employing the trigger switch of the present invention.

Referring to FIG. 12, the test signal is first applied to the locking receiving circuit 3 to prevent subsequent trigger signals from generating a continuous locked alarm. Following the application of the test signal to the locking receiving circuit 3 activating the trigger switch 2 activates the alarm 7. This test sequence indicates that the trigger switch 2 properly activates the locking receiving circuit 3, and that the alarm 4 is functioning properly. The driver realizing that the alarm 4 was properly activated would then release trigger switch 2, and if the trigger switch 2 is functioning properly, the alarm 4 would be deactivated. Thus, the sequence demonstrates that the trigger switch 2 is operational, that the trigger signal is received by the locking receiving circuit 3, and that the alarm 4 can be turned on and off. Finally, the test signal would be removed. Following this test sequence any time the trigger switch is activated, the locking receiving circuit 3 provides a continuous locked signal activating the alarm 4 and indicating that the driver is in danger. The alarm can then only be deactivated by reception of the remote or manual key disable signal 29.

An additional feature of the test capability shown in FIG. 12 is the self-deactivation of the test mode. Specifically, a circuit such as one shot 30 receives the test signal and provides a conditioned prevent locking pulse 27 to the locking alarm generating circuit 28. The prevent locking pulse 27 has a duration of, for example, 10-20 seconds.

Figure 13:
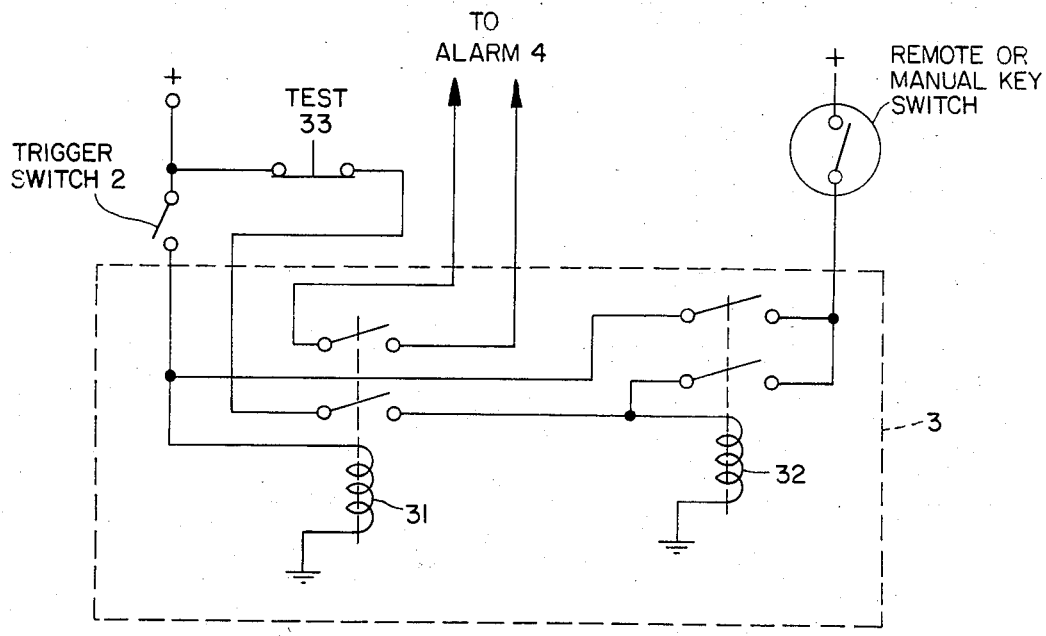
FIG. 13 is a schematic diagram illustrating one embodiment of the locking receiving circuit of FIG. 12.

FIG. 13 illustrates an electro-mechanical embodiment of the locking receiving circuit 3. In this circuit, relay 32 provides the locking current for relay 31. Test button 33 prevents the relays from locking, while permitting the trigger switch 2 to momentarily activate the alarm 4.

It will be apparent to those skilled in the art that modifications and variations could be made in the trigger switch 2, locking receiving circuit 3 and the alarms 4 and 23. Thus, it is intended that the present invention covers the modifications and variations of this invention within the scope of the appended claims and their equivalents.

What is claimed is:

1. A vehicle alarm triggering system for a vehicle having a pedal with a front and a back surface, said pedal being normally activated by applying a positive force against the front surface of the pedal, comprising:
triggering means, operatively connected to said pedal, having active and inactive operational states, and arranged to be activated by a reverse force in a direction toward the back surface of said pedal, for providing a trigger signal responsive to the triggering means being activated; and alarm means for providing an alarm signal in response to the trigger signal.

2. A vehicle alarm triggering system according to claim 1, further comprising:
locking receiving means, operatively connected to receive the trigger signal, for sensing a change in the operational state of the trigger means and for providing a continuous activating signal responsive to the change in the operational state of the trigger means; and
alarm means, operatively connected to receive the activating signal, for providing an alarm signal responsive to the activating signal.

3. A vehicle alarm triggering system according to claim 1, wherein said pedal corresponds to a brake pedal and said triggering means is mounted on the rear of the brake pedal.

4. A vehicle alarm triggering system according to claim 2, wherein said pedal corresponds to a brake pedal and said triggering means is mounted on the rear of the brake pedal.

5. A vehicle alarm triggering system according to claim 3, wherein said triggering means comprises one of a dry-reed encapsulated switch, a Hall-effect switch and a mechanical switch, and is operatively connected to the pedal.

6. A vehicle alarm triggering system according to claim 4, wherein said triggering means comprises one of a dry-reed encapsulated switch, a Hall-effect switch and a relay.

7. A vehicle alarm triggering system according to claim 3, wherien said alarm means comprises a radio transmitter for transmitting the alarm signal at a predetermined frequency.

8. A vehicle alarm triggering system according to claim 4, wherein said alarm means comprises a radio transmitter for transmitting the alarm signal at a predetermined frequency.

9. A vehicle alarm triggering system according to claim 3, wherein said alarm means comprises an astable circuit for activating one of an audible alarm and a silent alarm.

10. A vehicle alarm triggering system according to claim 4, wherein said alarm means comprises an astable circuit for activating one of an audible alarm and a silent alarm.

11. A vehicle alarm triggering system according to claim 2, wherein said locking receiving means is operatively connected to receive a test signal, and activates the alarm in response to said test signal.

12. A vehicle alarm triggering system for connection with a locking receiving circuit and an alarm circuit activated by the locking receiving circuit provided in a vehicle having a pedal with a front and a back surface, said pedal being normally activated by applying a positive force against the front surface of the pedal, said system comprising:

triggering means, operatively connected to said pedal and having active and inactive operational states arranged to be activated by a reverse force in a direction toward the back surface of said pedal for providing a trigger signal responsive to the operational states; and means for activating the locking receiving circuit in response to said trigger signal.

13. A vehicle alarm triggering system according to claim 12, wherein said locking receiving circuit is operatively connected to receive a test signal, and activates the alarm in response to said test signal.

* * * * *